(12) United States Patent
Mutz

(10) Patent No.: US 11,835,075 B2
(45) Date of Patent: Dec. 5, 2023

(54) CLIP FOR SECURING A FIRST ELEMENT TO A SECOND ELEMENT

(71) Applicant: A. Raymond et Cie SCS, Grenoble (FR)

(72) Inventor: Rainer Mutz, Eimeldingen (DE)

(73) Assignee: RAYMOND ET CIE, Grenoble (FR)

( * ) Notice: Subject to any disclaimer, the term of this patent is extended or adjusted under 35 U.S.C. 154(b) by 1021 days.

(21) Appl. No.: 16/466,929

(22) PCT Filed: Dec. 7, 2017

(86) PCT No.: PCT/EP2017/081774
§ 371 (c)(1),
(2) Date: Jun. 5, 2019

(87) PCT Pub. No.: WO2018/104421
PCT Pub. Date: Jun. 14, 2018

(65) Prior Publication Data
US 2020/0063779 A1    Feb. 27, 2020

(30) Foreign Application Priority Data
Dec. 9, 2016   (DE) ................. 10 2016 014 628.1

(51) Int. Cl.
*F16B 21/08*   (2006.01)
*F16B 2/20*   (2006.01)
*F16B 5/06*   (2006.01)

(52) U.S. Cl.
CPC ............ *F16B 21/086* (2013.01); *F16B 2/205* (2013.01); *F16B 5/0607* (2013.01)

(58) Field of Classification Search
CPC ........ F16B 21/086; F16B 2/205; F16B 2/243; F16B 2/245; F16B 5/0607; F16B 5/0642;
(Continued)

(56) References Cited

U.S. PATENT DOCUMENTS 6,154,933 A * 12/2000 Vetter .................. F16B 5/0664
24/297
7,874,775 B2 * 1/2011 Hullmann ............... B60R 11/00
411/173
(Continued)

FOREIGN PATENT DOCUMENTS

DE   112009001765 T5   8/2011
DE   102015209881 A1   12/2016
(Continued)

OTHER PUBLICATIONS

English translation of International Search Report for PCT/EP2017/081774 dated May 28, 2018, 2 pages.
(Continued)

*Primary Examiner* — Matthew R McMahon
(74) *Attorney, Agent, or Firm* — WARNER NORCROSS + JUDD LLP

(57) ABSTRACT

Disclosed is a clip for fastening a first element to a second element, the clip having a head and a tip and a first side and a second side, wherein the first side extends from the head toward the tip and the second side extends from the head toward the tip. A first sidewall extends from the first side toward the second side and a second sidewall extends from the second side toward the first side, the clip having a latching projection projecting in a latching direction and having a latching face facing the latching direction. The latching face is arranged in a plane which is not parallel to the first sidewall and/or not parallel to the second sidewall. The clip further includes a latching receptacle.

14 Claims, 6 Drawing Sheets

(58) Field of Classification Search
CPC .... F16B 2/24; F16B 2/241; F16B 5/12; F16B 5/125
See application file for complete search history.

(56) References Cited

U.S. PATENT DOCUMENTS

| | | | |
|---|---|---|---|
| 8,636,454 B2 * | 1/2014 | Okada | F16B 5/0642 24/295 |
| 9,009,928 B2 | 4/2015 | Binkert | |
| 9,453,523 B2 * | 9/2016 | Maschat | F16B 21/086 |
| 2015/0300388 A1 | 10/2015 | Maschat et al. | |
| 2018/0163756 A1 | 6/2018 | Schulz et al. | |

FOREIGN PATENT DOCUMENTS

| | | | |
|---|---|---|---|
| EP | 2687731 A1 * | 1/2014 | ............ F16B 1/0071 |
| EP | 2687731 A1 | 1/2015 | |
| EP | 2404067 B1 | 10/2015 | |
| WO | WO-2009109269 A1 * | 9/2009 | ............ B60N 3/026 |
| WO | 2009109269 A1 | 11/2009 | |
| WO | 2010101803 A1 | 9/2010 | |
| WO | 2012058807 A1 | 5/2012 | |
| WO | 2012104250 A1 | 8/2012 | |
| WO | 2016114856 A1 | 7/2016 | |

OTHER PUBLICATIONS

Machine assisted English translation of WO2009109269A1 obtained from https://patents.google.com on Jun. 5, 2019, 8 pages.
Machine assisted English translation of EP2687731A1 obtained from https://patents.google.com on Jun. 5, 2019, 11 pages.

* cited by examiner

CLIP FOR SECURING A FIRST ELEMENT TO A SECOND ELEMENT

CROSS-REFERENCE TO RELATED APPLICATIONS

This application is the National Stage of International Application No. PCT/EP2017/081774, filed on 7 Dec. 2017, which claims priority to and all advantages of German Patent Application No. 10 2016 014 628.1, filed on 9 Dec. 2016, the content of which are hereby incorporated by reference.

FIELD OF THE INVENTION

The invention generally relates to a clip for fastening a first element to a second element. The invention further relates to a device comprising a first element and a second element fastened to the first element, wherein the first element defines an opening in which a clip can be inserted, and the second element is fastened to the first element by a clip.

BACKGROUND OF THE INVENTION

WO 2012/104250 A1 describes a clip for fastening a first element to a second element. The clip has a head and a tip. The clip described there has a first side (described there as outer wing 13) and a second side opposite the first side. The first side extends from the head to the tip, which is formed inter alia by the two apices of the arcuate bend sections 15, which are provided at the end of the first side. Likewise, the second side extends from the head towards the tip, the tip being further formed by the two apices of two arcuate bend sections provided at the end of the second side. In the clip known from WO 2012/104250 A1, a first sidewall, which is referred to there as edge wing 21, extends from the first side (from the outer wing 13) in the direction of the second side (in the direction of the outer wing 13 opposite the one outer wing 13). Further, a second sidewall extends from the second side toward the first side.

From EP 2,404,067 B1 a clip is known for securing a first element to a second element, wherein the clip has a head and a tip. In the clip known from EP 2,404,067 B1, a first side is provided extending from the head toward the tip and a second side extending from the head toward the tip. A first sidewall extends from the first side toward the second side and a second sidewall extends from the second side toward the first side.

BRIEF SUMMARY

A clip for securing a first element to a second element is disclosed. The clip comprises a head and a tip. The clip further comprises a first side and a second side, the first side extending from the head towards the tip and the second side extending from the head in the direction of the tip. A first sidewall extends from the first side toward the second side and a second sidewall extends from the second side toward the first side. In addition, the clip comprises a latching projection projecting in a latching direction and having a latching face facing the latching direction, the latching face being arranged in a plane which is not parallel to the first sidewall and/or not parallel to the second sidewall. The clip also comprises a latching receptacle which has an edge and a counterface adjoining the edge, wherein the latching projection projecting in the latching direction projects beyond the edge (34) so that the latching face faces the counterface.

The invention is based on the idea of connecting together the two sidewalls, or the two sides, or strip sections guided back and contacting the tip, via a closure, and thereby preventing movements of these elements relative to each other, at least in one direction of movement. For this purpose, the invention provides a latching projection projecting in a latching direction, which has a latching face in front facing the latching direction and a latching receptacle having an edge and a counterface adjoining the edge, wherein the latching projection projecting in the latching direction projects beyond the edge, so that the latching face faces the counterface. The invention has recognized that the shaft of the clip can in this way be made particularly rigid or stable.

A "clip" for fastening a first element to a second element is understood as a fastening device having at least a first contact surface and at least a second contact surface turned towards the first contact surface. The first contact surface is usually provided on a fixed element of the fastening device, while the second contact surface is provided on a resilient element of the fastening device. Such fastening devices are intended to be inserted with a tip in a receptacle, usually a hole, in the first element. In this case, the second contact surface bearing a resilient element is pressed in during insertion, but after passing through the hole springs back to its original position. The first element usually takes the form of a planar element, for example, a plate or a sheet metal part of a frame of a vehicle. However, the first element may also have a blind hole with a correspondingly selected undercut which allows the resilient element to rebound after passing through a narrower part of the hole above the undercut. The second element can be fastened to the first element by clamping, for example if it is pushed between a head of the clip and a surface of the first element, and the distance of the first contact surface, which is then provided at the head of the clip, and the second contact surface of the clip is selected such that it can produce such clamping with a certain material thickness of the first element and a certain material thickness of the second element. It is also conceivable for the second element likewise to have a hole and the clip to be guided with its tip through both holes. It is also conceivable for the second element to be attached to a head of the clip, for example, if this has a hook or a mushroom-shaped fastener or if the second element is simply glued or welded to the head of the clip, or otherwise joined together.

A head of such a clip understood as a widening provided at one end of the clip. The head is usually designed to prevent the clip from being pushed all the way through a hole in the first element. The head is often also designed to be able to administer the applied force to the clip for the insertion of the clip into a hole in the first element. For this purpose, the clip often has a flat surface facing away from the tip. In certain embodiments, the head is rigid, wherein "rigid" means that no portion of the head is movable relative to another head, for example, being resilient. In an alternative embodiment, the head has a rigid body on which resilient elements associated to the head, such as resilient arms or umbrella-like sealing lips, are provided. In certain embodiments, the largest cross-sectional area of all cross-sectional areas of the head in planes perpendicular to the longitudinal axis of the clip is greater than the largest cross-sectional area of all cross-sectional areas of the shaft in planes perpendicular to the longitudinal axis of the clip.

The clip also has a tip. In the context of this description, "tip" refers only to the end of the clip opposite the head. It is true that, in certain embodiments, it is provided that a shaft of the clip extending from the head in the direction of the tip tapers towards the tip. However, this is not absolutely necessary. A tip in the context of this description can also be understood in a conceivable embodiment as a blunt end at the head opposite end of a shaft. In certain embodiments, the tip may be tapered in pyramidal or conical or truncated pyramidal or truncated conical form. The tip may also be formed by the ridge of a roof-shaped end section of a shaft extending from the head to the tip. However, this is not absolutely necessary. The tip can be formed by a single section of the clip. In certain embodiments, however, the tip is formed from a plurality of sections of the clip, for example, by the four vertices of the arcuate bend sections 15 as shown in WO 2012/104250 A2 or the two vertices of the curve sections of the embodiments illustrated in FIGS. 1, 2, 7, 8, 9,10 of EP 2,404,067 B1.

Between the head and the tip, the clip has a shaft, possibly comprising a plurality of parts. The clip has a longitudinal axis that extends from the head to the tip. In certain embodiments, the shaft is longer in its longitudinal extension pointing from the head to the tip than in a width direction perpendicular to the longitudinal extension. In certain embodiments the longitudinal axis of the clip in the direction of the longitudinal extension has the shaft. In certain embodiments, the clip is designed to be mirror-symmetrical with respect to a plane containing the longitudinal axis of the clip. In an alternative embodiment, the clip is designed to be rotationally symmetrical in such a manner that there is at least one plane containing the longitudinal axis of the clip, with which each section of the clip located on one side of such plane can be brought into alignment with an identically formed section of the clip on the other side of that plane via a 180° rotation about the longitudinal axis.

The clip has a first side extending from the head toward the tip. The clip has a shaft, possibly also formed from several elements of the clip. This shaft has a first side extending from the head toward the tip. This shaft likewise has a second side extending from the head toward the tip. In certain embodiments, the first side extends from the head to the tip, wherein portions of the clip that contribute to the formation of the tip contact the tip-end end of the first side. In certain embodiments, the second side extends from the head to the tip, wherein portions of the clip which contribute to the formation of the tip contact the tip-end end of the second side. But there are also conceivable designs in which the shaft of the clip, although starting from the head, begins with a first side and a second side, each extending in the direction of the head, but then between the first side and the portions of the clips forming the tip, are provided with other portions of the clip facing in other directions, in particular in relation to the extension of the first side, and/or then however between the second side and the portions of the clip forming the tip, are provided with other portions of the clip facing in other directions, especially in relation to the extension of the second side.

In certain embodiments the first sidewall and the second sidewall are aligned flush. In particular, the term "flush" is understood to mean that the first sidewall has a face which faces outward and the second sidewall has a face that faces outward and that the outward-facing face of the first sidewall and the outward-facing face of the second sidewall are arranged on one plane. In certain embodiments, the first sidewall and the second sidewall are arranged on the same side of a plane that contains the longitudinal axis of the clip.

The clip according to the invention has a first sidewall which extends from the first side in the direction of the second side. In certain embodiments, the clip has a third sidewall which also extends from the first side towards the second side, the first sidewall extending from a first edge of the first side toward the second side and the third sidewall extending toward the second side from a second edge, opposite the first edge, of the first side. In certain embodiments, the clip has a fourth sidewall which also extends from the second side toward the first side, the second sidewall extending from a first edge of the second side toward the first side and the fourth sidewall extending toward the first side from a second edge, opposite the first edge, of the second side. In certain embodiments, the third sidewall and the fourth sidewall are aligned flush. In particular, the term "flush" means that the third sidewall has an outward-facing face and the fourth sidewall has an outward-facing face, and that the outward-facing face of the third sidewall and the outward-facing face of the fourth sidewall are arranged on one plane. In certain embodiments the first sidewall is parallel to the third sidewall and/or the second sidewall is parallel to the fourth sidewall.

As stated above, the clip may be mirror-symmetric with respect to a plane containing the longitudinal axis of the clip. In such an embodiment, the third sidewall is configured like the first sidewall, and the fourth sidewall is configured like the second sidewall, so that the following explanations of features of the first sidewall are also explanations of features of the third sidewall and the following explanations of features of the second sidewall are also explanations of features of the fourth sidewall. However, as stated above, the clip may also be rotationally symmetrical in that it has at least one plane containing the longitudinal axis of the clip, in which each section of the clip located on one side of this plane when rotated 180° about the longitudinal axis can be brought into alignment with an identically formed section of the clip on the other side of this plane. In such an embodiment, the third sidewall is configured like the second sidewall, and the fourth sidewall is configured like the first sidewall, so that the following explanations of features of the first sidewall are also explanations of features of the fourth sidewall and the following explanations of features of the second sidewall are also explanations of features of the third sidewall.

In the description, the interior of the clip is understood to mean the immediate area around the longitudinal axis of the clip and/or that space enclosed by the first side, the second side and the first sidewall and the second sidewall and, if present, that by the third sidewall and the fourth sidewall. As far as outward-facing surfaces are mentioned or the term "outward" is otherwise used in this description, it means a direction that points away from the longitudinal axis of the clip.

In the clip according to the invention, a latching projection and a latching receptacle are provided. In certain embodiments, the latching projection and the latching receptacle form a closure. The latching projection projects in a latching direction and has a latching face facing the opposite way to the latching direction, wherein the latching face is arranged in a plane which is not parallel to the first sidewall and/or not parallel to the second sidewall. The latching receptacle has an edge and a counterface adjoining the edge, wherein the latching projection projecting in the latching direction projects beyond the edge, so that the latching face faces the counterface. Due to the latching face facing the counterface, the latch face abuts the counterface when it is moved in the direction of the counterface. This provides the possibility of preventing the movement of two elements of the clip relative to one another, namely the movement of a first element having the latching projection relative to a second element having the latching receptacle, at least in one direction, or blocking it from a certain distance, namely when the latching face contacts the counterface.

The object of the latching projection is to provide a part of the one element of the clip which is not intended to be movable away from another element by the interaction of latching projection and latching receptacle, at least in one direction, or which can only be moved away along a certain path, said part being able to interact with the latching receptacle, namely by the overhanging of the latching projection over the edge of the latching receptacle. This task can already be fulfilled by a latching projection which projects finger-like in the latching direction of a part of the one element. In this case, the latching projection can be made narrow in the manner of a finger. But designs are also conceivable in which the extension of the latching projection is made wider in a direction perpendicular to the latching direction and the latching projection is designed, for example, in the manner of an edge plate or angle plate. However, the latching projection can also be formed by a block-like section of an element of a clip, which projects from other sections of this element.

In certain embodiments, the latching projection has a main body extending in the latching direction, from which material projects in a direction perpendicular to the latching direction, wherein a face is formed on this material which forms the latching ace facing the opposite way to the latching direction.

The task of the latching receptacle is to provide the counterface, which faces the latching face, and to form an edge, so that the latching projection can project beyond the edge from a region located behind the counterface and thereby bring the latching face into a position facing the counterface. The task of the edge is therefore solely to limit the extension of the element having the counterface in the direction of the projecting latching projection. This task can be achieved with a variety of arrangements of edges. In certain embodiments, the edge is formed by two abutting surfaces at an angle, for example at an angle of 90°, of which the counterface is typically one. However, the counterface does not necessarily have to be adjacent to the edge (even if this is preferred or typical). It is also further conceivable for surface areas not belonging to the counterface to be provided between the edge and the counterface. In an alternative embodiment, the edge has a chamfer or is arcuate in cross-section.

The closure provided with the invention can be used in different areas of a clip to prevent the movement of two elements of the clip relative to each other, namely the movement of a first element, having the latching projection, relative to a second element, having the latching receptacle, at least in that direction, or to block said movement from a certain distance, namely when the latching face contacts the counterface. By establishing that the latching face is arranged in a plane which is not parallel to the first sidewall and/or not parallel to the second sidewall, the invention is designed to prevent movements of two elements of the clip relative to one another, in which the direction of movement would have a component parallel to the first sidewall and/or parallel to the second sidewall.

In certain embodiments, a latching projection and latching receptacle be provided on similar elements of the clip. For example, the latching projection can project from the first side and the latching receptacle may be provided in the second side. Likewise, the latching projection may project from the first sidewall and the latching receptacle may be formed in the second sidewall. Likewise, the tip can be made in two parts and be formed by a strip section continuing the first side and inwardly curved and a second strip section continuing the second side and inwardly curved, wherein the first strip section continues with a first inner section from the tip toward the head, and wherein the second strip section continues with a second inner section from the tip toward the head, and wherein the latching projection projects from the first inner section and the first latching receptacle is formed as part of the second inner section. Alternatively, embodiments are conceivable in which the latching projection and the latching receptacle are not provided on similar elements of the clip, for example, the latching projection projects from the first side and the latching receptacle is designed as part of the second sidewall or of the second inner section or, for example, the latching projection of the first sidewall projects and the latching receptacle is designed as part of the second side or of the second inner section or, for example, the latching projection projects from the first inner section and the latching receptacle is designed as part of the second side or of the second sidewall.

In certain embodiments, the latching projection and/or the latching receptacle may take the form of an undercut. An undercut is a structural element that can prevent the latching receptacle or latching projection from moving freely. The movement of the sidewalls relative to one another can be reduced or almost completely prevented by the formation of latching projection and latching receptacle. There may be a face associated with the latching receptacle and a face associated with the latching projection which run essentially parallel to one another. There may be a pair of faces comprising a latching projection and latching receptacle, which forms an angle with the longitudinal axis of the shaft of the clip, which is smaller than 45°. In particular, the angle may be less than 40°, alternatively less than 30°, alternatively less than 20°, alternatively less than 10°. In one embodiment, the angle may have substantially only a slight or not even any deviation from the longitudinal axis of the shaft. A pair of faces comprising a latching receptacle and latching projection can thus exist, which is formed substantially parallel to the longitudinal axis of the shaft.

In certain embodiments, the latching face is flat and/or the counterface is flat. In certain embodiments, the latching face and the counterface are aligned parallel to each other.

In certain embodiments, the latching projection takes the form of a projection and/or the latching receptacle takes the form of a recess. For example, a projection of one sidewall can engage in a recess of the opposite sidewall. Analogous to the above statements regarding the latching receptacles and latching projections, the movement of the sidewalls relative to one another, here for example also along the longitudinal axis of the clip, can be reduced or almost completely prevented by the functionally interacting pair of elements consisting of projection and recess. In the context of this description, a projection engages in a recess when the projection and/or the recess forms an opening for the respective other element and the respective other element is located in this opening.

In certain embodiments, the latching face is arranged in a plane which is perpendicular to the first sidewall and/or perpendicular to the second sidewall. In this way, a strong closure and/or coupling effect of the two sides of the clip can be achieved, in particular for fixing and preventing the two sides from drifting apart in the primary spreading direction, which is perpendicular to the surfaces of the two sides. An adequate effect can already be achieved when a latching face extends substantially perpendicular to the first sidewall or perpendicular to the second sidewall. The embodiments mentioned in this section for a latching face effectively apply in certain embodiments to a counterface.

In another embodiment, the latching projection of the respective side engages a latching receptacle on the respective opposite side, which projects from the main plane of the opposite side and/or is curved out of it.

In addition to preventing the relative movement of the two sides and/or sidewalls of the clip on which the functionally interacting pair of elements is formed, not only the movement of opposite sidewalls and/or sides away from each other can be prevented, but in particular additionally a relative movement perpendicular to the main plane of the sidewalls.

In a further embodiment, the latching projection may take the form of an arm projecting from a sidewall and/or the shaft side in the direction of the opposite sidewall and/or shaft side and having a hook at the end, which engages behind an elongated recess, in particular a slot, in the region of the tip and/or a strip section and/or a curved section. In particular, the elongated recess may extend substantially from the tip of the clip over the two curved and/or strip sections to the apex forming the tip. In particular, the tip of the latching projection has a widened section, which in particular engages behind the recess perpendicular to its longitudinal extent. In particular, the latching projection is held in the recess by clamping and/or latching.

The two functional element pairs in the assembled state can form a closure, which in particular is irreversible.

In certain embodiments, the latching projection projects from the first sidewall and the latching receptacle is formed as part of the second sidewall or by a section projecting inwardly from the second sidewall.

In certain embodiments, the latching receptacle takes the form of part of a recess formed in the sidewall and/or side. A recess represents in particular a simple possible realization of a latching receptacle, but may have the same functional properties as the latching receptacle described in more detail above.

In certain embodiments, opposite sidewalls have a profile consisting of projections and recesses which are shaped complementary to one another. A complementary formation with projections and recesses and formed on opposite sidewalls can lead to a further stabilization of the clip, in which pairs of faces can be created, which are associated with each other and can interact. The interaction of the faces pairing of latching receptacle and latching projection may be present during loading of the clip, so that a mutual contacting of the faces pairings of recesses and projections does not have to be constantly present, but may be limited only to the loading case in question. A movement of the sidewalls relative to each other can be reduced via a provided profiling.

In certain embodiments, the closure of latching projection and latching receptacle forms a lock and thus prevents spreading of the sides. In this way, the sides of the clip can, for example, be prevented from reaching an open position, as may be present at least temporarily during the production of the clip. In the context of the description, the term "irreversible closure" includes a closure which, contrary to the direction of formation of the closure, cannot be reversed without destroying the clip.

In certain embodiments, the first sidewall and/or the second sidewall has one or more projecting fingers that overlap a portion of the opposite sidewall. In the context of this description, a finger overlaps a portion of a sidewall when at least a part of the finger is so arranged that it intersects a surface normal of a surface of this area and/or a line perpendicular to a longitudinal axis of the finger intersects the area of the sidewall. It is not absolutely necessary for the success of the invention that a surface of the finger be in contact with a surface of the region of the sidewall which the finger overlaps. In certain embodiments, however, one surface of the finger is in contact with the surface of the portion of the sidewall which it overlaps.

In certain embodiments, one of the two sidewalls, for example, the first sidewall, has a plurality of projecting fingers that overlap over other portions of the opposing sidewall. Thus, the first sidewall may have a first projecting finger overlapping a portion of the second sidewall, the first sidewall having a second projecting finger overlapping another portion of the second sidewall. As a result, the shaft of the clip can be made particularly torsion-resistant and buckling-resistant if two projecting fingers of a first sidewall overlap portions of the second sidewall.

In certain embodiments, the length of the finger is greater than the width of the finger, the length being understood to mean the direction of the extension of the finger from the first sidewall in the direction of the second sidewall. In addition to the width perpendicular to the length, the finger typically has a height, which is generally predetermined by the thickness of the material and can also be referred to as the thickness. In certain embodiments, the width of the finger is greater than the height (thickness) of the finger. In certain embodiments, the width direction of the finger extends parallel to the longitudinal axis of the clip and/or the longitudinal direction of the finger is perpendicular to the longitudinal axis or perpendicular to a line parallel to the longitudinal axis.

In certain embodiments, the first sidewall has a main body from which projects the first projecting finger, or from which the second projecting finger projects. In particular, the main body typically has a length, wherein the length is understood in particular to be the extension of the main body from the first side in the direction of the second side. In certain embodiments, the first side passes via an edge into the first sidewall. The length is then understood in particular as the maximum extent of the basic body from this edge in the direction of the second side. Additionally or alternatively, the length direction of the main body extends perpendicular to the longitudinal axis of the clip, or perpendicular to a line which is parallel to the longitudinal axis of the clip. In particular, the main body typically also has a width, which in generally extends in a direction parallel to the longitudinal axis of the clip. The main body also has a height, which can also be referred to as a thickness and is usually predetermined by the thickness of the material. In certain embodiments, the width of the main body is greater than the length of the main body.

In certain embodiments, the width of the first projecting finger and/or the width of the second projecting finger is less than the width of the main body. In certain embodiments, the width of a projecting finger is less than half the width of the main body, alternatively less than one third, alternatively less than one quarter of the width of the main body.

In certain embodiments, the width of the first projecting finger is equal to the width of the second projecting finger. In certain embodiments, the distance of the end of the first projecting finger from the second side is equal to the distance of the second projecting finger from the second side.

In certain embodiments, the width of the main body of the first sidewall and/or the width of the main body of the second sidewall is greater than 40%, alternatively greater than 50%, alternatively greater than 60%, alternatively greater than 70%, alternatively greater than 80% of the extension of the shaft of the clip.

In certain embodiments, the length of the projecting finger is less than the maximum length of the main body. In an alternative embodiment, the length of the projecting finger is equal to the maximum length of the main body. In an alternative embodiment, the length of the projecting finger is greater than the maximum length of the main body.

In certain embodiments, the first side passes via an edge into the first sidewall, wherein this edge is interrupted by a recess. In certain embodiments, an outwardly resiliently preloaded element of the clip extends outwardly right through the recess to the outside. A preload towards the outside is also understood to mean an embodiment in which the preloaded element has a rest position in which it projects from a partial region of the shaft, for example one side of the shaft, and out of which it can be moved outwardly under the application of force, for example in a direction perpendicular to the shaft axis (longitudinal axis), or in a direction parallel to a perpendicular to the shaft axis (longitudinal axis). The preloaded element can be connected to a resilient element or to part of a resilient element, so that under the application of force it must be moved from the rest position against an increasing spring force and the spring force causes the projection to return to its rest position after removal of the force. In certain embodiments, the rest position is the position in which the resilient element exerts no force. The rest position may, but need not, be defined by a stop against which the resilient element pushes or pulls the preloaded element. In certain embodiments, the second side passes via an edge into the second sidewall, wherein this edge is interrupted by a recess. In certain embodiments, an outwardly resiliently preloaded element of the clip extends outwardly right through the recess to the outside.

In certain embodiments, the first side passes via an edge into the first sidewall, the edge extending in a direction parallel to the longitudinal axis of the clip. In certain embodiments, the second side passes via an edge into the second sidewall, the edge extending in a direction parallel to the longitudinal axis of the clip.

In certain embodiments, the region of the second side which the first projecting finger of the first sidewall overlaps is adjacent to the region of the second side which the second projecting finger of the first sidewall overlaps. In certain embodiments, the first projecting finger of the first sidewall and the second projecting finger of the first sidewall are arranged side by side.

In certain embodiments, the first projecting finger of the first sidewall is closer to a first end of a main body of the first sidewall (viewed in the width direction of the sidewall) than to an opposite, second end of the main body. In certain embodiments, the first end is the end of the main body that is closer to the head. Additionally or alternatively, the second projecting finger of the first sidewall is closer to the second end of the main body of the first sidewall (viewed in the width direction of the sidewall) than to the opposite, first end of the main body. In particular, the second end may be the end of the main body that is closer to the tip.

In certain embodiments, the first sidewall has a flat main body. In certain embodiments, the second sidewall has a flat main body. A flat main body is understood to mean a main body having a flat outer surface, for example arranged in a plane. In particular, the flat main body may additionally have a uniform height (thickness). It is conceivable that a flat main body referred to here as flat has bulges, for example, small knobs or guide ribs, or indentations or dents. Even a main body provided with intentionally chosen, singular deviations from the purely geometrically flat shape is understood in the course of this description to be a flat body. If the flat main body intentionally has a selected, singular deviation from the purely geometrically flat shape, for example bulges, for example small knobs or guide ribs or indentations or dimples, then in certain embodiments the surface occupied by the singular deviation in the plane, which the otherwise geometrically flat surface of the main body occupies, is less than 30%, alternatively less than 20%, alternatively less than 10% of the area of the remaining geometrically flat surface. If the flat main body intentionally has a plurality of selected, singular deviations from the purely geometrically flat shape, for example bulges, for example small knobs or guide ribs or indentations or dents, then in certain embodiments the area occupied by each singular deviation in the plane which the otherwise geometric flat surface of the body occupies is less than 30%, alternatively less than 20%, alternatively less than 10% of the area of the remaining geometrically flat surface. If the flat main body intentionally has a plurality of selected, singular deviations from the purely geometrically flat shape, for example bulges, for example small knobs or guide ribs or indentations or dents, then in certain embodiments the sum of all surfaces occupied by the singular deviations in the plane which occupy the otherwise geometric flat surface of the main body is less than 30%, alternatively less than 20%, alternatively less than 10% of the area of the remaining geometrically flat surface. In certain embodiments, the flat main body is completely flat even in the geometrical sense and has no singular deviation from the purely geometrically flat shape.

In certain embodiments, the first finger is aligned flush with a flat main body of the first sidewall. In specific embodiments, the outwardly facing surface of the finger lies in a plane with the outwardly facing surface of the main body. In certain embodiments, the projecting finger additionally has the same material thickness (thickness, height) as the main body. In specific embodiments, there is no curved section between the main body and the first projecting finger.

In various embodiments, the first sidewall has a flat main body, wherein the second projecting finger has an outwardly or inwardly curved arcuate section. In certain embodiments, the second projecting finger has an end section which is parallel to the flat main body. This is to be understood as the end section of the second finger having an outwardly facing surface which extends in a plane which optionally extends parallel to a plane in which the outwardly facing surface of the main body extends. In particular, the end section of the second projecting finger additionally has the same material thickness as the main body. In certain embodiments, a curved section is located between the main body and the end section of the second finger. In specific embodiments, the curved section takes the form of a double bend, which is first curved in a first direction and then subsequently curved in a different direction.

In certain embodiments, the second sidewall has a receptacle for receiving the first projecting finger. In particular, a depression in a main body of the second sidewall is understood as a receptacle, or a section of the sidewall which extends parallel and offset to a flat main body of the sidewall, wherein the transition between the flat main body and the parallel offset section can be formed by a throat. It can be assumed here that the parallel offset section provided is, for manufacturing reasons, not perfectly parallel aligned and therefore possibly also can be angled to the flat body. Likewise, it may not be possible, for manufacturing reasons, to make the parallel offset or angularly extending portion perfectly flat. In certain embodiments, the first projecting finger of the first sidewall is aligned flush with a flat main body of the second sidewall. To allow an overlap of the first projecting finger of the first sidewall with a portion of the second sidewall in such an embodiment, the area of the second sidewall which a so designed first projecting finger of the first sidewall is overlapped by a setback-like or recess-like or pocket-like feature or depression-like recess of the second main body.

In certain embodiments, the second sidewall has at least one projecting finger overlapping a portion of the first sidewall. In certain embodiments, the projecting finger of the second sidewall is formed like the second projecting finger of the first sidewall.

In certain embodiments, the first sidewall has a flat main body, wherein a narrow side of the main body faces the first side of the second sidewall, wherein the second sidewall has a flat main body, wherein a narrow side of the main body of the second sidewall faces the first sidewall. In certain embodiments, the narrow side of the body extends at right angles to an outwardly facing surface of the body. In this embodiment, the narrow side of the first sidewall and/or the narrow side of the second sidewall is formed flat at least in sections. In certain embodiments, the narrow side of the first sidewall extends in a plane that is parallel to the longitudinal axis or includes the longitudinal axis of the clip and/or the narrow side of the second sidewall of a plane that is parallel to the longitudinal axis or contains the longitudinal axis of the clip.

In certain embodiments, the first projecting finger overlaps over a portion of the main body of the second sidewall adjacent to the flat narrow side of the second sidewall, and/or the second projecting finger overlaps a portion of the main body of the second sidewall adjacent to the flat narrow side of the second sidewall.

In certain embodiments, the first sidewall has a flat main body and a narrow side flat in a first portion, wherein the flat portion of the narrow side extends in a direction parallel to the longitudinal axis of the clip. In this embodiment, the main body then has adjacent to the flat section of the narrow side a projection projecting in the direction of the second sidewall. In certain embodiments, the projection engages in a setback or a recess provided in the second sidewall. In certain embodiments, the second sidewall has a flat main body and a narrow side that is flat in its first portion, wherein the setback or the recess adjoins the flat portion of the narrow side. Additionally or alternatively, the second sidewall has a flat main body and a narrow side that is flat in a first portion, wherein the flat portion of the narrow side extends in a direction parallel to the longitudinal axis of the clip. In this embodiment, the main body then has adjacent to the flat section of the narrow side a projection extending in the direction of the first sidewall. In certain embodiments, the projection engages in a setback or a recess provided in the first sidewall. In certain embodiments, the first sidewall has a flat main body and a narrow side that is flat in a first portion, wherein the setback or the recess adjoins the flat portion of the narrow side. In this case, these projections are not projecting fingers, because they do not overlap a portion of the opposite sidewall. By this interaction of projections and recesses on the narrow sides of the main body of the sidewalls, a toothed feature can be generated which increases the rigidity of the clip because it prevents relative movements of the main body of the sidewalls in the direction parallel to the longitudinal direction of the clip.

In certain embodiments, a curve is provided at one end of the first side, wherein the apex of the curve at the end of the first side forms part of the tip of the clip and/or a curve is provided at one end of the second side, wherein the apex of the curve at the end of the second side forms part of the tip of the clip. In this case, the curve can be formed starting from the side inwards, as is provided, for example, in the curved section 15 of WO 2012/104205 A1. Likewise, the curve can be curved outwardly.

In certain embodiments, the first side has a flat body extending from the head towards the tip, and the first sidewall has a flat body which is at an angle to the flat body of the first side, for example at an angle between 45° and 135°, alternatively at an angle of 90°.

In certain embodiments, the second side has a flat body extending from the head towards the tip, and the second sidewall has a flat body which is at an angle to the flat body of the second side, for example at an angle between 45° and 135°, alternatively at an angle of 90°.

In certain embodiments, the flat body of the first side is aligned parallel to the flat body of the second side. In certain embodiments, the clip has a first side with a flat main body, a second side aligned parallel to the first side and having with a flat main body, a first sidewall having a flat main body extending at an angle from the first side to the second side, a second sidewall having a flat main body extending from the second side toward the first side, wherein the first sidewall is formed flush with the second sidewall, and also a third sidewall having a flat main body extending at an angle from the first side to the second side, and a fourth sidewall having a flat main body extending from the second side toward the first side, the third sidewall being formed flush with the fourth sidewall. Such an embodiment may have a cross-section in the form of a rectangular ring in a cross-section perpendicular to the longitudinal axis of the clip, which is interrupted only by a gap between the first sidewall and the second sidewall and by a gap between the third sidewall and the fourth sidewall.

In certain embodiments, a clip face is provided which projects from the first side and which is at a distance from the head and which faces the head. The clip face can be provided on a resilient element, which is preloaded in the outward direction. A preloading towards the outside is also understood here to mean an embodiment in which the preloaded element has a rest position in which it projects from a partial region of the shaft, for example, from one side of the shaft, and out of which it can be moved out under the application of force, e.g. in a direction perpendicular to the shaft axis (longitudinal axis), or in a direction which is parallel to a perpendicular to the shaft axis (longitudinal axis). The preloaded element can be connected to a resilient element or part of a resilient element so that under application of force it has to be moved from the rest position against an increasing spring force and the spring force causes the projection to return to its rest position after removal of the force. In certain embodiments, the rest position is the position in which the resilient element exerts no force. The rest position may, but need not, be defined by a stop against which the resilient element pushes or pulls the preloaded element. This resilient element can pass through a recess which is defined on the first side and/or in the transition from the first side to the first sidewall. In certain embodiments, a clip face is provided which projects from the second side and which is at a distance from the head and which faces the head. In specific embodiments, this clip face is provided on a resilient element, which is preloaded in the outward direction. A preloading towards the outside is also understood to mean an embodiment in which the preloaded element has a rest position in which it projects from a partial region of the shaft, for example, from one side of the shaft, and out of which it can be moved out under the application of force, for example in a direction perpendicular to the shaft axis (longitudinal axis), or in a direction which is parallel to a perpendicular to the shaft axis (longitudinal axis). In specific embodiments, the preloaded element is connected to a resilient element or part of a resilient element so that under application of force it has to be moved from the rest position against an increasing spring force and the spring force causes the projection to return to its rest position after removal of the force. In certain embodiments, the rest position is the position in which the resilient element exerts no force. The rest position may, but need not, be defined by a stop against which the resilient element pushes or pulls the preloaded element. This resilient element can pass through a recess which is defined on the second side and/or in the transition from the second side to the second sidewall. In certain embodiments, four clip faces are provided, two projecting from the first side and two projecting from the second side, each at a distance from the head and facing the head, and typically each provided on a resilient element which is preloaded in the outward direction. A preloading towards the outside is also understood to mean an embodiment in which the preloaded element has a rest position in which it projects from a partial region of the shaft, for example, from one side of the shaft, and out of which it can be moved out under the application of force, for example in a direction perpendicular to the shaft axis (longitudinal axis), or in a direction which is parallel to a perpendicular to the shaft axis (longitudinal axis). In specific embodiments, the preloaded element is connected to a resilient element or part of a resilient element so that under application of force it has to be moved from the rest position against an increasing spring force and the spring force causes the projection to return to its rest position after removal of the force. In certain embodiments, the rest position is the position in which the resilient element exerts no force. The rest position may, but need not be, defined by a stop against which the resilient pushes or pulls the preloaded element.

In certain embodiments, a resilient element having the clip face has a chamfer. The chamfer may be formed so that the chamfer tapers in the direction of the tip. This makes it possible for the resilient element, during insertion of the clip with the tip into a hole of an element, to come into contact with the edge delimiting the hole and be pressed inwardly by this edge against the spring preloading.

In certain embodiments, the head of the clip has a head face, which faces the clip face. In a specific embodiment, the clip face extends parallel to the head face when the resilient element is in its initial position, that is, sprung to the outside. In certain embodiments, the head face is formed on a fixed portion of the head. In an alternative embodiment, the head has resilient arms which can spring in a direction parallel to the longitudinal direction of the clip, the head face being provided on a portion of the arm, for example provided on an end section of the arm.

In certain embodiments, the head and the first side and the first sidewall and the second side and the second sidewall are all part of a one-piece element created by bending portions of a metal portion. Likewise, it is conceivable to produce the plastic clip according to the invention by, for example, injection molding.

According to a further aspect of the invention, which can also be combined with the above-described first aspect, a clip for fastening a first element to a second element is proposed, wherein the clip comprises, alternatively consists of
  a head and a tip, and
  a first side and a second side, the first side extending from the head towards the tip and the second side extending from the head toward the tip,
  with a first sidewall extending from the first side toward the second side,
  wherein the head has a side face and a tip-facing contact face and
  the side face of the head passes via a first rounded edge into the tip-facing contact face of the head and the first side passes via a second rounded edge into the first sidewall and the first rounded edge passes via a curved section into the second rounded edge.

In certain embodiments, in the first aspect of the invention described above, the first component is designed such that the first component comprises
  a head and a tip, and
  a first side and a second side, the first side extending from the head towards the tip and the second side extending from the head towards the tip,
  with a first sidewall extending from the first side towards the second side,
wherein the head has a side face and a tip-facing contact surface and
the side face of the head passes over a rounded edge into the tip-facing contact surface of the head, and/or
the first side passes into the first sidewall via a rounded edge.

The use of the rounded edges avoids peaks, recesses or edges in these areas which can damage the elements to be connected. In particular, in the embodiment in which the side face of the head passes via a first rounded edge into the tip-facing contact surface of the head and the first side passes via a second rounded edge into the first sidewall and the first rounded edge passes via a curved section into the second rounded edge, the risk of damaging the two elements to be connected can be greatly reduced.

In certain embodiments, the side face of the head is flush with the first side.

In certain embodiments, the rounded edge via which the first side passes into the first sidewall extends in a direction parallel to the longitudinal axis (shank axis) of the clip, while the rounded edge with which the side face of the head merges into the tip-facing contact surface of the head extends in a direction which is at an angle, for example perpendicular, to the direction in which the rounded edge extends, with which the first page passes into the first sidewall. The rounded edge may be designed to be arcuate in a cross-section perpendicular to the line into which the edge extends.

In particular, the arcuate section, with which the first rounded edge passes into the second rounded edge, is executed in the manner of a throat.

In certain embodiments, the contact surface of the head facing the tip passes into the first sidewall via a curved section.

The clip according to the invention is can be used for fastening an element (the second element) to a body part (the first element) of a vehicle, for example to the frame of a vehicle. For example, the clip can be used to fasten a panel (second element) to the frame of a vehicle (first element).

As another example, the clip can be used for fastening an airbag to a body part, for example a frame of a vehicle.

The device according to the invention has a first element and a second element attached to the first element, wherein the first element defines a hole and the second element is fastened to the first element via a clip according to the invention, wherein the clip passes through the hole such that the head of the clip is arranged on one side of the first element and the tip of the clip on the opposite side of the element. In certain embodiments, the clip passes through the hole such that the head of the clip is arranged on one side of the first element and a clip face of the clip on the opposite side of the element. In certain embodiments, the first element is a body part of a vehicle, for example a frame of a vehicle. In certain embodiments, the second element is a panel or an airbag.

BRIEF DESCRIPTION OF THE DRAWINGS

The invention is described in greater detail below with reference to the accompanying figures, in which.

DETAILED DESCRIPTION

Figure 1:
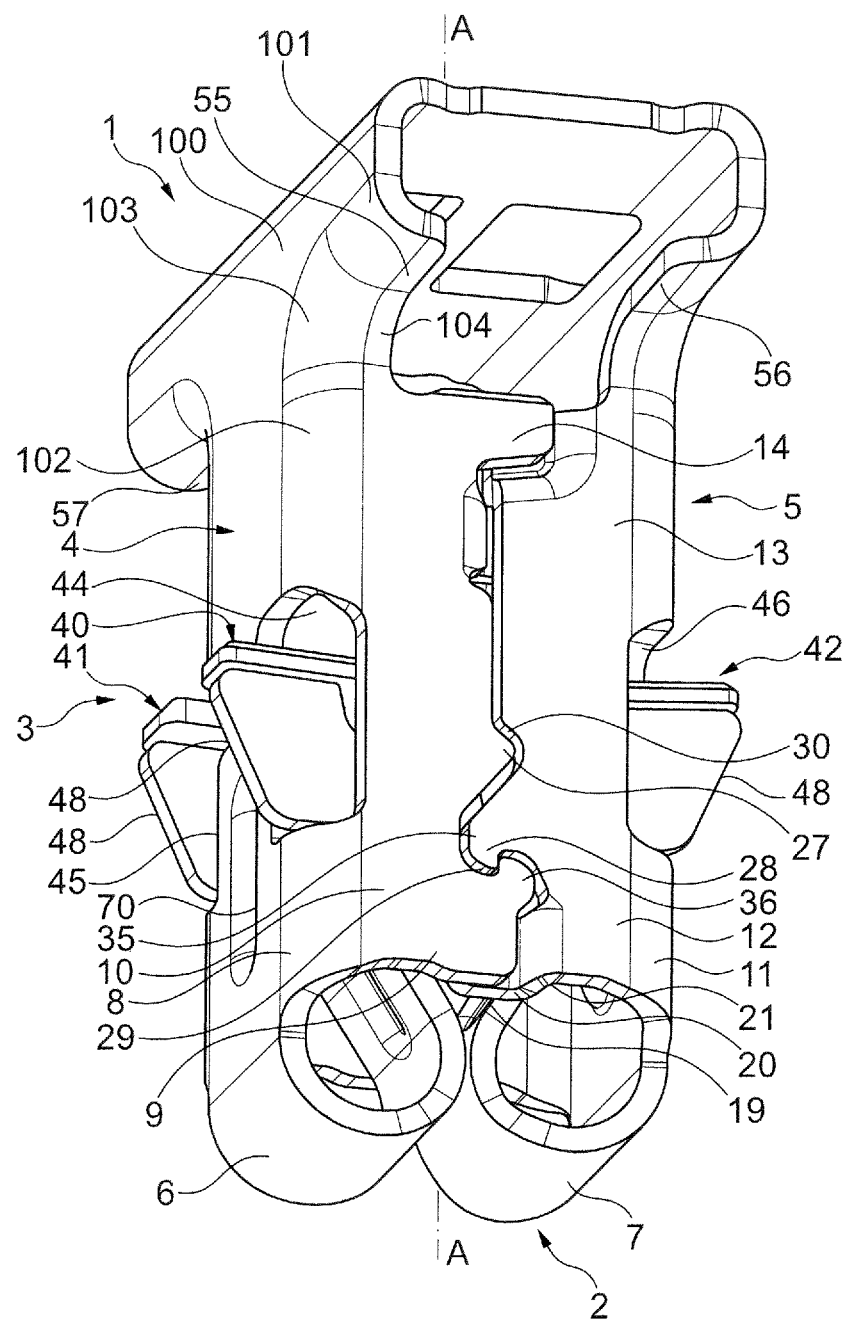
FIG. 1 shows a perspective side view obliquely from below of a clip according to one embodiment of the invention.

Referring to the Figures, wherein like numerals indicate corresponding parts throughout the several views, a clip for fastening a first element to a second element has a head 1 and a tip 2. Between the head 1 and the tip 2 a shaft 3 comprising several sections extends.

The shaft 3 has a first side 4 and a second side 5 arranged opposite the first side 4 relative to a longitudinal axis A of the clip and running parallel to the first side 4. Both the first side 4 and the second side 5 extend from the head 1 in the direction of the tip 2. The first side 4 ends in an arcuate curved section 6, which is curved inwardly starting from the first side 4. The apex of the curve of the curved section 6 forms part of the tip 2. The second side 5 ends in an arcuate curved section 7, which is curved inwardly. The apex of the curve of the curved section 7 forms part of the tip 2 of the clip.

The first side 4 passes via an edge 8 into the flat main body 9 of a first sidewall 10, which extends from the first side 4 in the direction of the second side 5. The second side 5 passes via an edge 11 into the flat main body 12 of a second sidewall 13, which extends from the second side 5 in the direction of the first side 4.

Figure 2:
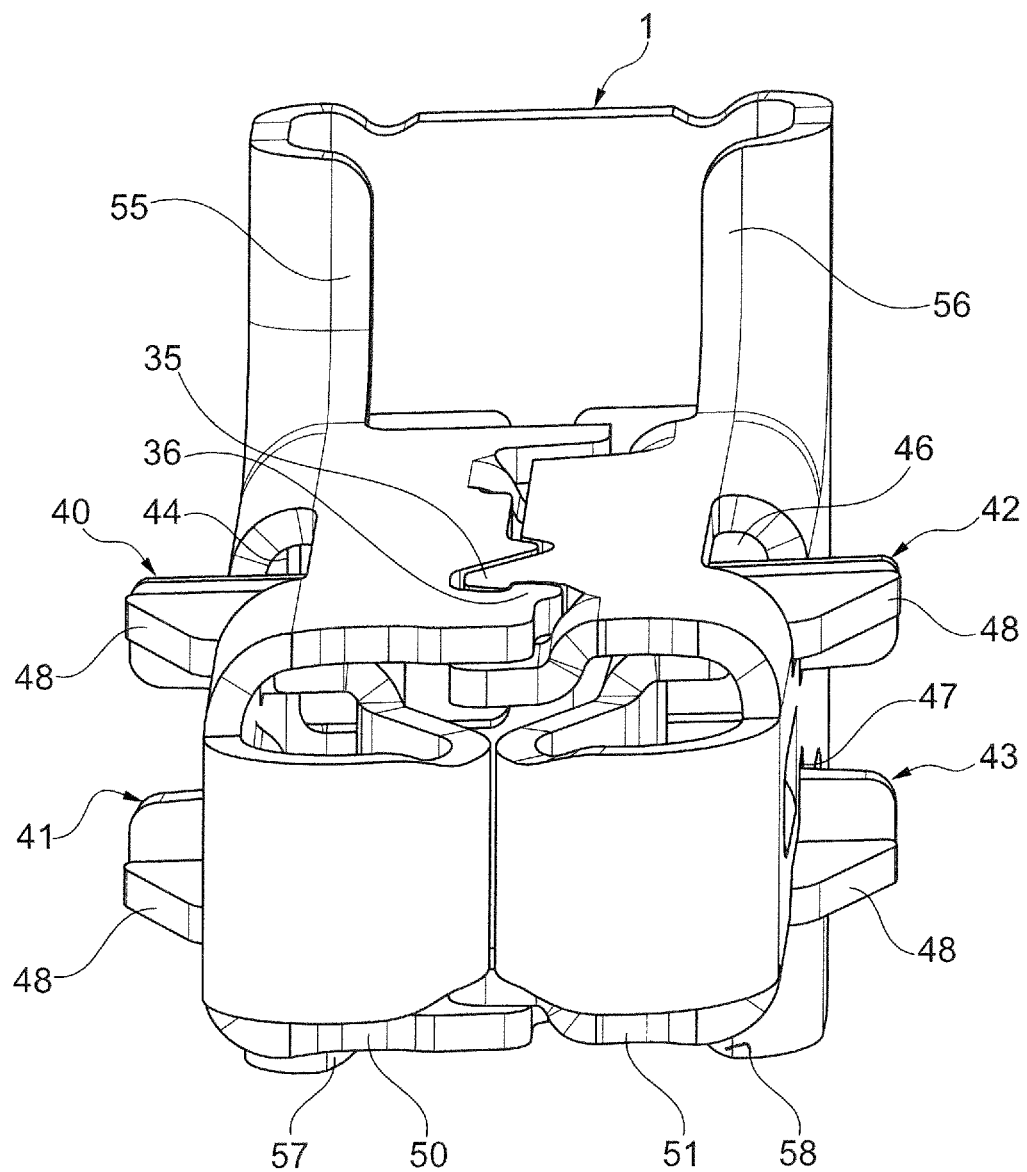
FIG. 2 shows a perspective view from below of a tip of the clip according to the invention according to FIG. 1.
Figure 3:
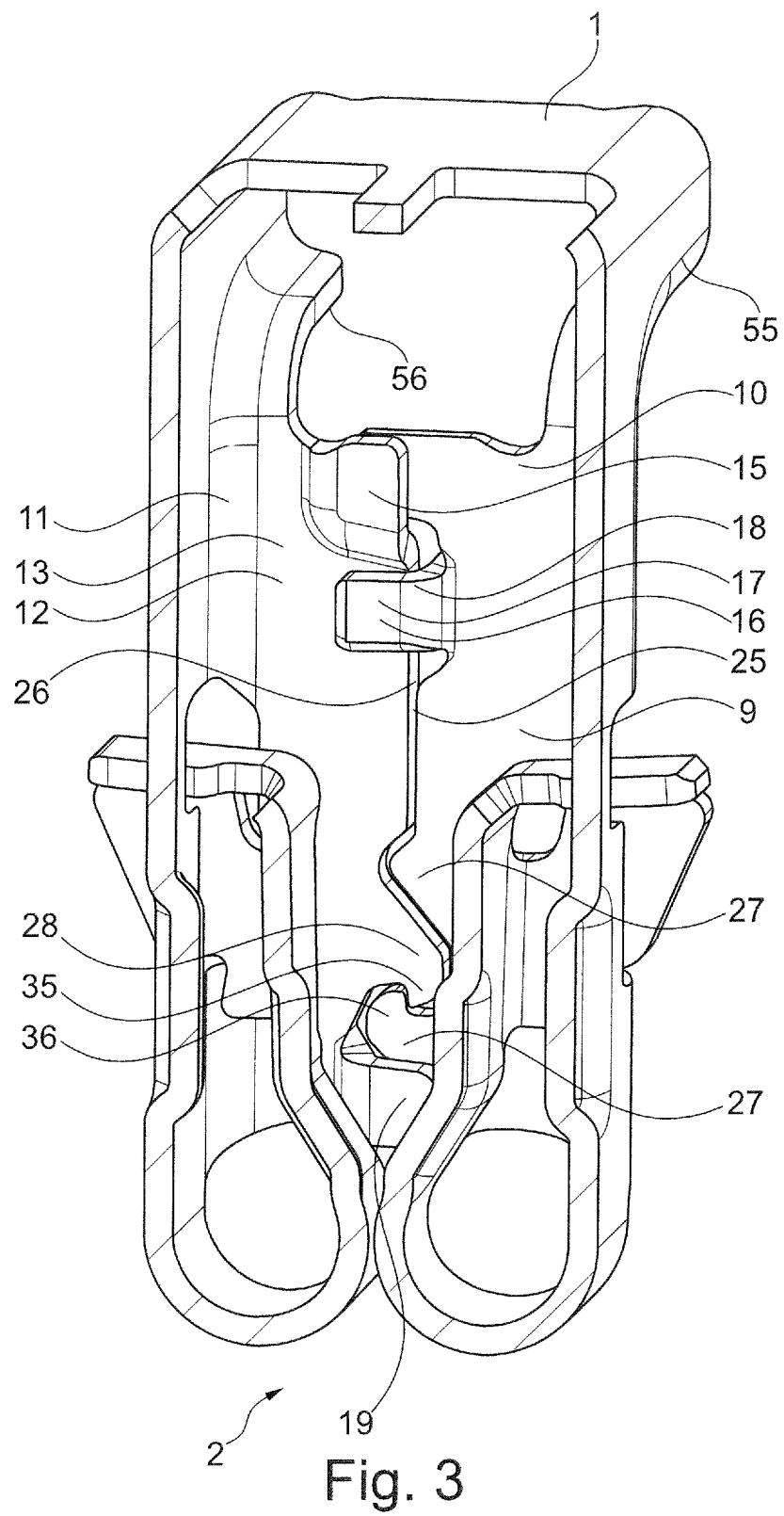
FIG. 3 shows a sectioned, perspective side view of the clip according to the invention according to FIG. 1.

The clip shown in FIGS. 1 to 3 is constructed mirror-symmetrically with respect to a plane which contains the longitudinal axis A and runs parallel to the main body 9 and to the main body 12. From the side 4 there thus extends a third sidewall 50 (not shown in FIG. 1) in the direction of the second side 5, wherein the third sidewall 50 is designed corresponding to the first sidewall 10. Furthermore, a fourth sidewall 51 (not shown in FIG. 1) extends from the second side 5 in the direction of the first side 4, wherein the fourth sidewall 51 is designed corresponding to the second sidewall 13. The clip according to the invention in the embodiment shown in the figures is a one-piece element and has been produced by bending sections of a metal section.

The first sidewall has a first projecting finger 14 overlapping a portion of the second sidewall 13. For this purpose, the second sidewall 13, better visible in FIG. 3, is shown in the form of an indentation 15. Furthermore, the first sidewall 10 has a second projecting finger 16 (see FIG. 3). This second projecting finger 16 of the first sidewall 10 overlaps another portion of the second sidewall 13. In this case, the first projecting finger 14 of the first sidewall is aligned flush with the flat main body 9 of the first sidewall, while the second projecting finger 16 is curved inwardly and engages behind the second sidewall 13. For this purpose, the second finger 16 has a bending curved section 18 provided between the flat main body 9 and the end section 17 of the second finger 16, which is initially curved inwardly and then curved in the opposite direction, so that the end section 17 of the finger 16 extends parallel to the main body 12 of the second sidewall 13. The second sidewall 13 has a projecting finger 19 overlapping a portion of the first sidewall 10. The projecting finger 19 of the second sidewall 13 is formed similar to the second projecting finger 16 in the first sidewall and has an end section 20 which extends parallel to the main body 9 of the first sidewall and a curved section 21 which is provided between the base body 12 of the second sidewall 13 and the end section 20.

The main body 9 of the first sidewall 10 has a narrow side 25. The main body 12 of the second sidewall 13 has a narrow side 26. The narrow side 25 and the narrow side 26 are flat over a first portion and extend in this section substantially parallel to each other, wherein the flat portion of the narrow side 26 of the second sidewall 13 is longer than the flat portion of the narrow side 25 of the first sidewall 10. The second projecting finger 16 overlaps a portion of the main body 12 of the second sidewall 13, which is adjacent to the flat portion of the narrow side 26 of the second sidewall. In the region in which the second projecting finger 16 engages behind the main body 12 of the second sidewall 13, this has a flat portion of the narrow side 26. As shown particularly clearly in FIGS. 1 and 2, a profile consisting of projections 27, 28 and recesses 29, 30 adjoins the planar section of the narrow side 25 and the planar section of the narrow side 26. Here the respective projection 27, 28 of the respective sidewall 10, 13 engages in a recess 30, 29 of the opposite sidewall 13, 10. The projections 27, 28 are designed such that they do not overlap a region of the opposite sidewall but only engage recesses 29, 30 provided therein. With the projection 28, a latching projection 35 is formed, wherein with the recess 29, a latching receptacle 36 is formed. Latching projection 35 and latching receptacle 36 form a closure in which the latching projection 35 can engage behind the latching receptacle (36).

In the exemplary embodiment illustrated in FIGS. 1 to 3, the first side 4 and the second side 5 each have a flat main body. In FIG. 1 it can be seen that the otherwise flat main body 4 has a small elevation 70. This makes clear the understanding of the term "flat main body" as used in the context of this description is that only in a specific embodiment is a geometrically exactly flat body provided, but in other embodiments—as here—such a main body is also called a "flat main body", which differs on account of small projections from a geometrically exactly flat shape.

In the embodiment illustrated in FIGS. 1 to 3, the flat main body of the first side 4 is at an angle of 90 degrees to the flat main body 9 of the first sidewall 10. The flat main body of the second side 5 is at an angle of 90 degrees to the flat main body 12 of the second sidewall 13. The first sidewall 10 and the second sidewall 13 are aligned flush with each other (their outwardly facing surfaces are on a plane). The embodiment shown in the figures has four clip faces 40, 41, 42, 43. Each clip face is part of a flexible element that passes through a corresponding recess 44, 45, 46, 47, located in the respective transition between the side 4, 5 and the first side surface 10, the second side surface 13, the third side surface 50 and the fourth side surface 51. The elastic element in question has a chamfer 48 which causes the missing element, when the clip is inserted into a hole of an element, to come into contact with the edge of the hole and is pushed by the further insertion of the clip inwardly against the spring force, but after passing through the hole in the element, springs back out again due to the spring force and thereby engages behind the corresponding element.

The clip faces 40, 41, 42, 43 face the head 1. The head has four head faces 55, 56, 57, 58 which face the clip faces 40, 41, 42, 43. The first element and the second element are held between the clip faces 40, 41, 42, 43 and the head faces 50, 56, 57, 58, thereby securing the second element to the first element.

The head 1 has a side surface 100 and the contact surface (head face) 55 facing the tip 2, wherein the side surface 100 of the head passes over a first rounded edge 101 into the contact face 55 of the head facing the tip 2 and the first side 3 passes into the first sidewall 10 via a second rounded edge 102 and the first rounded edge 101 passes into the second rounded edge 102 via a curved section 103. The contact surface 55 of the head 1 facing the tip 2 passes via a curved section 104 into the first sidewall 10.

Figure 4:
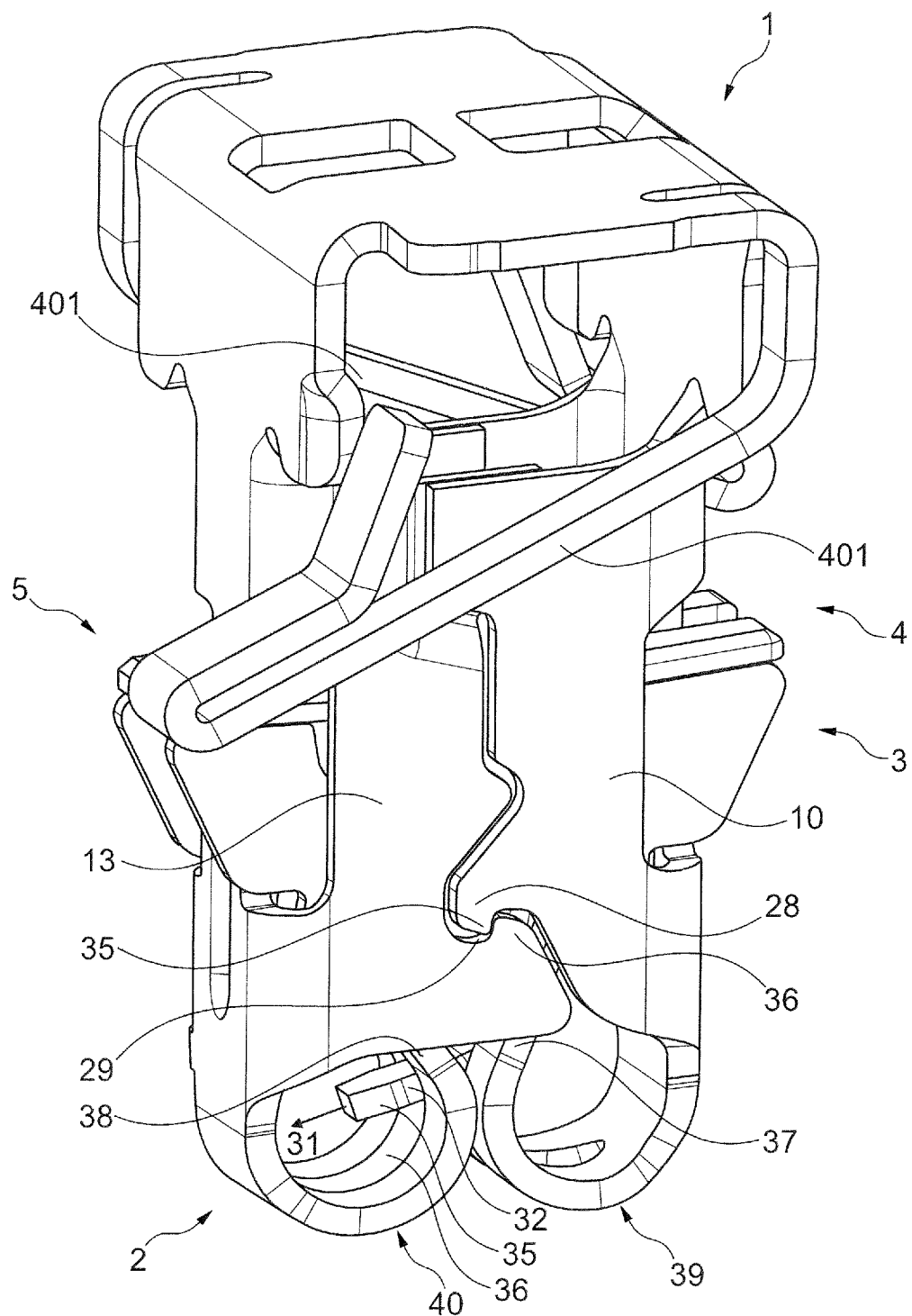
FIG. 4 shows a perspective side view obliquely from above of a clip according to the invention according to a further embodiment.

FIG. 4 shows a perspective side view obliquely from above of a clip according to the invention according to a further embodiment with additional functional formations in comparison to the previous embodiments. In the region of the head 1, this clip has an arm 401, which is essentially parallel to the sidewalls 10, 13, with bent hooks, which projects obliquely to the longitudinal axis of the clip and which stabilizes and holds the head 1 after mounting on an element and which projects beyond the extents of the rest of the clip. The exemplary embodiment in FIG. 5 shows a comparable embodiment of the head 1.

Figure 5:
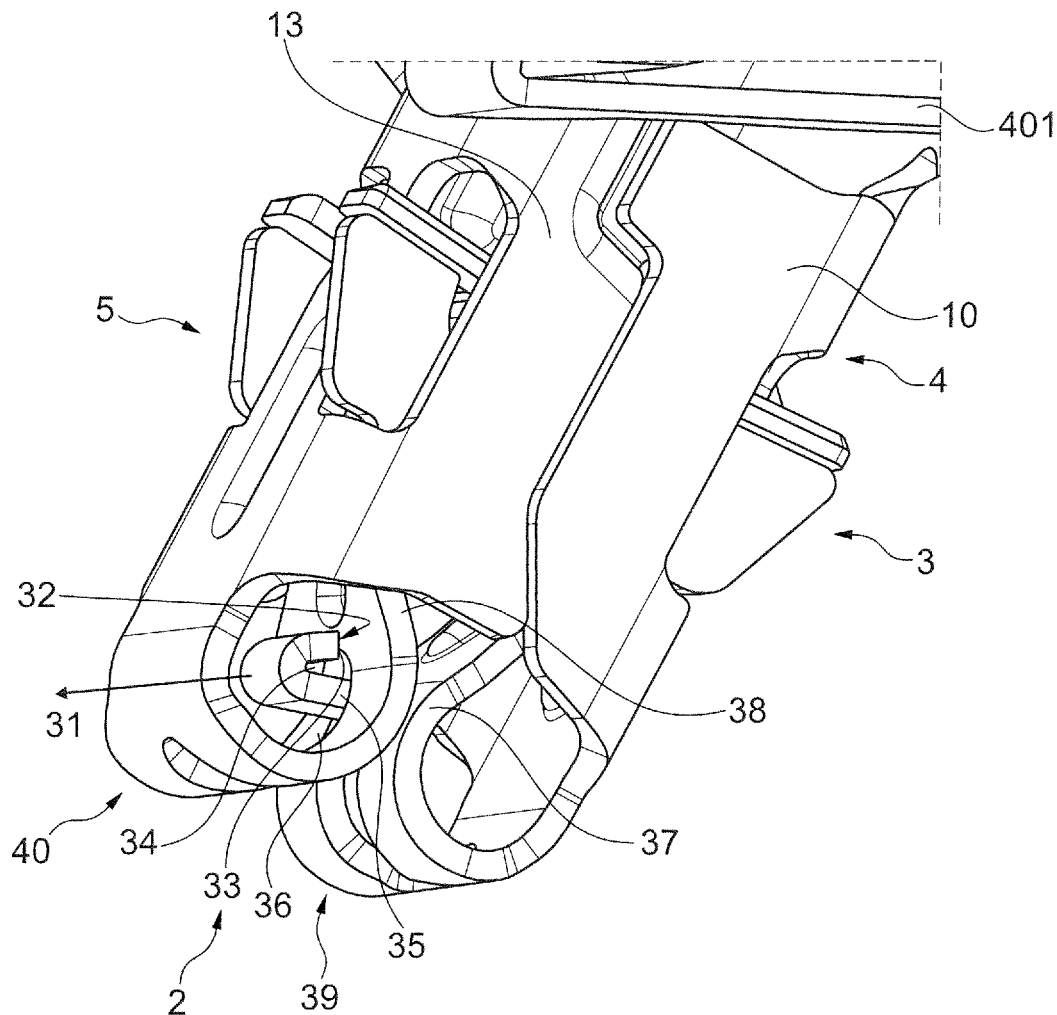
FIG. 5 shows a perspective side view obliquely from below of a clip according to the invention according to a further embodiment.
Figure 6:
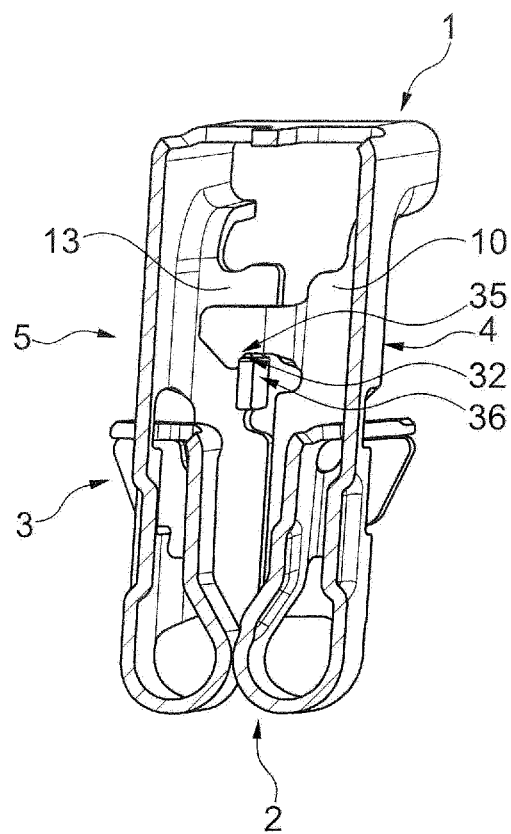
FIG. 6 shows a partially sectioned side perspective view obliquely from above of a clip according to the invention according to a further embodiment.

The tip 2 of the embodiments according to FIGS. 4 to 6 is made in two parts and formed by an inwardly curved first strip section 39 continuing the first side 4 and an inwardly curved second strip section 40 continuing the second side 5, wherein the first strip section 39 continues with a first inner portion 37 from the tip toward the head 1 and wherein the second strip section 40 continues with a second inner portion 38 from the tip 2 in the direction of the head 1.

In the embodiment according to FIG. 4, in addition to the closure provided between the first sidewall 10 and the second sidewall 13, there is a pin further provided in the region of the tip 2 which prevents a lateral movement of the two sides relative to one another.

FIG. 5 shows a perspective side view obliquely from below of the tip of a clip according to the invention according to a further embodiment with additional other functional formations in comparison to the previous embodiments. In the region of the tip 2, which is formed in each case by a curved section or first strip section 39 and second strip section 40, an additional closure with a latching projection 35 and a latching receptacle 36 is provided, wherein the latching projection 35 projects in the latching direction 31 and the latching face 32 is arranged in a plane which is not parallel to the first sidewall 10 and/or not parallel to the second sidewall 13, and a latching receptacle 36 which has an edge 34 and a counterface 33 adjoining the edge 34, wherein the latching projection 35 projecting in the latching direction 31 projects beyond the edge 34, so that the latching face 32 faces the counterface 33.

The latching projection 35 takes the form of an arm standing out from the first inner portion 37 in the direction of the opposite second inner portion 38 and having a hook in the form of a bent-back tip at the end, which engages behind the elongated recess in the form of a slot in the region of the second inner portion 38.

Figure 7:
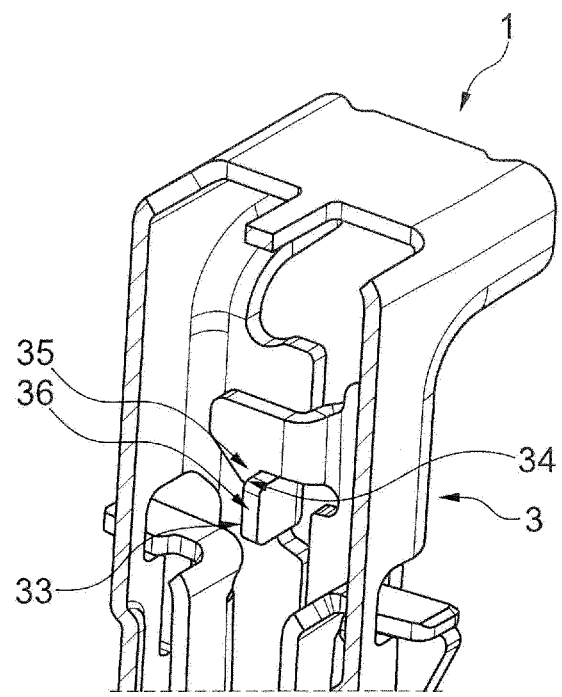
FIG. 7 shows a partially sectioned side perspective view obliquely from above of the clip according to the invention according to FIG. 6 in another section.

FIGS. 6 and 7 show a clip according to the invention according to a further embodiment with additional functional formations in comparison with the previous embodiments. Projecting from the first sidewall 10, a latching projection 35 is shown, which interacts with a latching receptacle 36 in the opposite second sidewall 13 and formed by a projection bent over by approximately 90 degrees. As a result, the functionally interacting pair of elements consisting of latching projection 35 and latching receptacle 36 can even reduce the movement of the sidewalls 10, 13 along the longitudinal axis of the clip.

Figure 8:
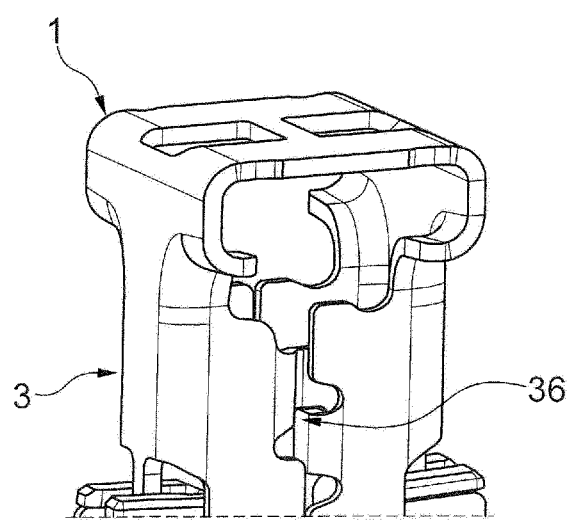
FIG. 8 shows a perspective side view obliquely from above of the upper part of a clip according to the invention according to a further embodiment.
Figure 9:
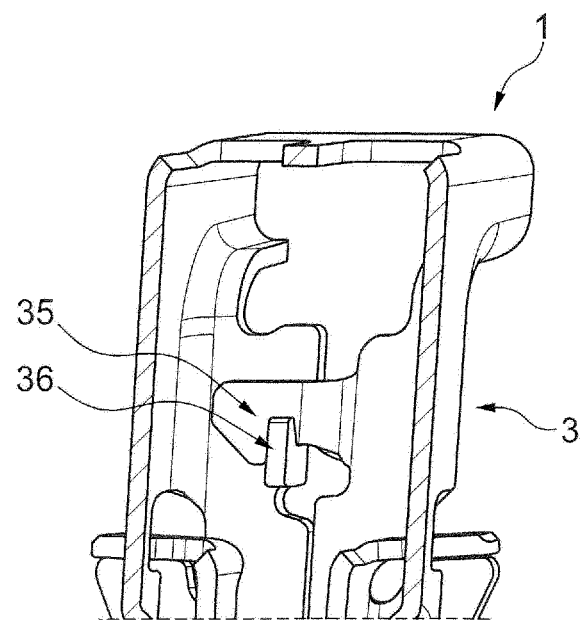
FIG. 9 shows a partially sectioned side perspective view obliquely from above of the clip according to the invention according to FIG. 8 in another section.

In FIGS. 8 and 9 an embodiment comparable to FIGS. 6 and 7 is shown, wherein at the end of the latching receptacle 36, a hook is provided which prevents the latching projection 35 from slipping off the latching receptacle 36.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A clip for securing a first element to a second element, the clip comprising:
    a head and a tip,
    a first side and a second side, the first side extending from the head towards the tip and the second side extending from the head in the direction of the tip,
    wherein a first sidewall extends from a longitudinal edge of the first side toward the second side and a second sidewall extends from a longitudinal edge of the second side toward the first side,
    wherein the first sidewall has a flat main body, the second sidewall has a flat main body, and the first sidewall and the second sidewall are aligned flush with each other such that an outwardly-facing surface of the first sidewall and an outwardly-facing surface of the second sidewall are arranged on a same plane,
    a latching projection projecting in a latching direction and having a latching face facing the latching direction, the latching face being arranged in a plane which is not parallel to the first sidewall and/or not parallel to the second sidewall, and
    a latching receptacle which has an edge and a counterface adjoining the edge, wherein the latching projection projecting in the latching direction projects beyond the edge so that the latching face faces the counterface,
    wherein the latching projection projects from the first sidewall and the latching receptacle is part of the second sidewall,
    wherein the latching face extends along a plane which is perpendicular to the first sidewall and/or perpendicular to the second sidewall.

2. The clip according to claim 1, wherein the tip comprises two parts and has an inwardly curved first strip section continuing the first side and an inwardly curved second strip section continuing the second side, wherein the first strip section continues with a first inner portion from the tip toward the head, wherein the second strip section continues with a second inner portion from the tip toward the head, and wherein a second latching projection projects from the first inner portion and a second latching receptacle is part of the second inner section.

3. The clip according to claim 1, wherein the clip further comprises a section projecting inwardly from the second sidewall.

4. The clip according to claim 1, wherein the latching receptacle is part of a recess defined by the second sidewall.

5. The clip according to claim 1, wherein opposite sidewalls have in each case a profile including projections and recesses which are shaped complementarily to each other.

6. The clip according to claim 1, wherein by the interaction of the latching projection with the latching receptacle a closure can be formed which prevents the sides from spreading apart.

7. The clip according to claim 1, wherein the first sidewall and/or the second sidewall has one or more projecting fingers which overlap a region of the respectively opposite sidewall.

8. The clip according to claim 1, wherein a narrow side of the main body of the first sidewall faces the second sidewall, wherein a narrow side of the main body of the second sidewall faces the first sidewall, wherein the narrow side of the first sidewall and/or the narrow side of the second sidewall are at least partially planar.

9. The clip according to claim 1, wherein a curve is provided at one end of the first side, the apex of the curve at the end of the first side forming part of the tip of the clip and/or a curve is provided at one end of the second side, wherein the apex of the curve at the end of the second side forms part of the tip of the clip.

10. The clip according to claim 1, wherein the first side has a flat main body extending from the head toward the tip, the flat main body of the first sidewall is at an angle to the flat main body of the first side, the second side has a flat main body extending from the head toward the tip, and the flat main body of the second sidewall is at an angle to the flat main body of the second side.

11. The clip according to claim 10, wherein the flat main body of the first side is aligned parallel to the flat main body of the second side.

12. The clip according to claim 1, further comprising a clip face which projects from the first side and which is at a distance from the head and faces the head.

13. The clip according to claim 12, further comprising a head face which faces the clip face.

14. The clip according to claim 1, wherein the head, the first side, the first sidewall, the second side, and the second sidewall are all part of a one-piece element created by bending portions of a metal section.

* * * * *